з,201,439
Patented Aug. 17, 1965

3,201,439
DIALKYL HYDROCARBONTHIOPHOSPHONOXY-
ALKOXYHYDROXYHEXAHYDROPHTHALATES
AND PROCESS FOR MAKING SAME
James M. Petersen, Fishkill, David D. Reed, Glenham,
and Herman D. Kluge, deceased, late of Fishkill, N.Y.,
by Hazel E. Kluge, administratrix, Fishkill, N.Y., assignors to Texaco Inc., New York, N.Y., a corporation
of Delaware
No Drawing. Filed Oct. 13, 1962, Ser. No. 232,645
7 Claims. (Cl. 260—461)

This invention relates to novel reaction products of dialkyl epoxyhexahydrophthalate and hydroxyalkyl hydrocarbonthiophosphonate. More particularly, the subject invention pertains to dialkyl hydrocarbonthiophosphonoxyalkoxyhydroxyhexahydrophthalate and to their method of manufacture.

The dialkyl hydrocarbonthiophosphonoxyalkoxyhydroxyhexahydrophthalate of this invention, hereafter known for the sake of brevity as alkoxyhexahydrophthalate derivatives, are represented by the formula:

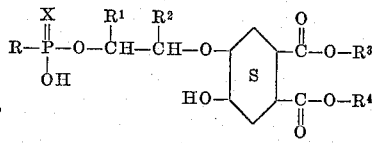

wherein R is a monovalent hydrocarbon derived radical (hydrocarbyl), $R^1$ and $R^2$ are hydrogen or alkyl of from 1 to 6 carbons, and $R^3$ and $R^4$ are alkyl of from 1 to 20 carbons, and X is sulfur or a mixture of sulfur and oxygen.

The alkoxyhexahydrophthalate derivatives of this invention are useful as thermal stability additives for fuels such as jet fuels.

Broadly, the alkoxyhexahydrophthalate derivatives are prepared by the reaction of hydroxyalkyl hydrocarbonthiophosphonate and dialkyl epoxyhexahydrophthalate at an elevated temperature in the presence of an acid or base catalyst.

PREPARATION OF THE HYDROXYALKYL
HYDROCARBONTHIOPHOSPHONATE REACTANT

The preparation of the hydroxyalkyl hydrocarbonthiophosphonate is described in co-assigned, co-pending applications Serial No. 59,505 filed September 30, 1960, now U.S. Patent No. 3,087,956, and Serial No. 63,973 filed October 21, 1960, now U.S. Patent No. 3,123,630.

The hydrocarbonthiophosphonic acid is prepared by first forming a $P_2S_5$-hydrocarbon reaction product by reacting a hydrocarbon with $P_2S_5$ ($P_2S_5$ about 5–40 wt. percent of reaction mass) at a temperature of from about 100–320° C. in an inert atmosphere, for example, under a blanket of nitrogen. The $P_2S_5$-hydrocarbon reaction product is then hydrolyzed to thiophosphonic acid by treating said reaction product with steam at a temperature of about 100 and 260° C. The hydrocarbonthiophosphonic acid formed has the general formula:

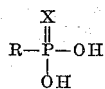

where R is a hydrocarbyl derived from the hydrocarbon reacted with the $P_2S_5$ and desirably is a mono-olefinic (alkenyl) radical containing 20 to 200 carbon atoms. X is defined as sulfur or a mixture of sulfur and oxygen. The reason X is designated as sulfur or a mixture of sulfur and oxygen is because the steam hydrolysis step in the conversion of the hydrocarbon-$P_2S_5$ product to thiophosphonic acid usually results in the replacement of a portion of the sulfur joined to the phosphorus with oxygen.

Inorganic phosphorus acids are formed during the hydrolysis of the hydrocarbon-$P_2S_5$ product to thiophosphonic acid and they are removed prior to the conversion of the thiophosphonic acid to thiophosphonate. The inorganic acids can be eliminated by a number of different procedures. One procedure is described in U.S. Patents Nos. 2,951,835 and 2,987,512 wherein the removal of inorganic phosphorus acid is effected by contacting synthetic hydrous alkaline earth metal silicates respectively. Commonly assigned co-pending application Serial No. 841,668, now U.S. Patent No. 3,135,729, filed September 23, 1959, by H. D. Kluge and R. G. Lacoste, describes a process wherein inorganic phosphorus acids are removed from the hydrolyzed product by extraction with anhydrous methanol. The hydrocarbon utilized in the reaction with $P_2S_5$ from which the R values in the foregoing formulas are derived can be aromatic, cycloaliphatic, aliphatic substituted aryl compounds, and aryl substituted aliphatic compounds. Olefins, however, are one of the more desirable hydrocarbon materials. The olefinic hydrocarbons reacted with $P_2S_5$ usually contain at least 12 carbon atoms although a lower molecular weight olefin can be employed. Mono-olefinic polymers such as polyisobutene, polybutene, polypropylene, and copolymers of mono-olefins such as the propylene-isobutene copolymer are specific examples of desirable olefins. In general, mono-olefinic polymers and copolymers having an average molecular weight between about 250 and 50,000 are employed as a hydrocarbon reactant with polymers and copolymers having an average molecular weight in the range of 600 to 5,000 being particularly preferred. A particularly preferred olefin polymer is polybutene having an average molecular weight between 600 and 5,000.

The hydroxyalkyl hydrocarbonthiophosphonate reactant is prepared from the thiophosphonic acid by reacting the thiophosphonic acid with an alkylene oxide of the formula:

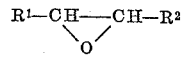

where $R^1$ and $R^2$ are hydrogen or alkyl from 1 to 6 carbons at a temperature between about 60 to 150° C. under a pressure between atmospheric and 500 p.s.i.g. and in a mole ratio of thiophosphonic acid to alkylene oxide of between 1:1 and 1:4 to form the hydroxyalkyl hydrocarbonthiophosphonate reactant of the formula:

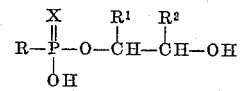

where R, $R^1$, $R^2$ and X are as heretofore defined.

Specific examples of the hydroxyalkyl hydrocarbonthiophosphonate reactants contemplated herein are 2-hydroxy-ethyl polybutene (940 M.W.) thiophosphonate, 4-hydroxyhex-3-yl polypropylene (1500 M.W.) thiophosphonate, and 3 - hydroxyhex-2-yl polyisopentene (2500 M.W.) thiophosphonate.

DIALKYL EPOXYHEXAHYDROPHTHALATE
REACTANT

The dialkyl epoxyhexahydrophthalate reactant contemplated herein is of the general formula:

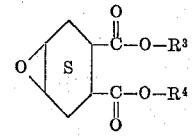

where $R^3$ and $R^4$ are the same or different alkyl radicals of from 1 to 20 carbons. Specific examples of the dialkyl epoxyhexahydrophthalates contemplated herein are diisodecyl 4,5-epoxyhexahydrophthalate, dihexyl 4,5-epoxyhexahydrophthalate, dibutyl 4,5-epoxyhexahydrophthalate and butyl isodecyl 4,5-epoxyhexahydrophthalate.

CATALYST

The presence of acid or base catalyst facilitates the reaction. Examples of classes of catalysts contemplated herein are the Lewis acids, organic acids, mineral acid, alkali metals, and alkali metal alcoholates. Specific examples are boron trifluoride etherate ($BF_3 \cdot C_2H_5OC_2H_5$), $BF_3$, $CCl_3CO_2H$, $CF_3COOH$, Na, K, $C_2H_5OK$, HF, $AlCl_3$, $SnCl_4$, $H_2SO_4$, and $H_3PO_4$.

PREPARATION OF THE ALKOXYHEXAHYDROPHTHALATE DERIVATIVES

The alkoxyhexahydrophthalate derivatives are prepared by contacting the hydroxyalkyl hydrocarbonthiophosphonate reactant with dialkyl epoxyhexahydrophthalate, at a temperature between about 25 and 150° C. in the presence of an acid or a base catalyst. The reactant mole ratio of thiophosphonate to hexahydrophthalate to catalyst is advantageously between about 0.1:1:0.001 and 2:1:0.1. Although superatmospheric and subatmospheric pressures may be employed, atmospheric pressure is normally utilized. The reaction is usually conducted for a period of 1 to 2 hours.

At the end of the reaction period the alkoxyhexahydrophthalate derivative can be purified by standard means such as clay contacting and contacting with an ion exchange resin.

Specific examples of the alkoxyhexahydrophthalate derivatives contemplated herein are diisodecyl 4-polybutene (940 M.W.)thiophosphonoxyethoxy - 5 - hydroxyhexahydrophthalate, dipentyl 4(polypropylene(1500 M.W.) thiophosphonoxy-1',2'-dimethylethoxy) - 5 - hydroxyhexahydrophthalate; and pentyl decyl 4 - (polypropene - polyisobutylene - copolymer(2500 M.W.)thiophosphonoxy-1' - methylethoxy) - 5 - hydroxyhexahydrophthalate.

Example I below illustrates the preparation of the hydroxyalkyl hydrocarbonthiophosphonate reactant. Example II illustrates the preparation of an example of the alkoxyhexahydrophthalate derivatives contemplated herein.

Example I

A polybutene-$P_2S_5$ reaction product was prepared by reacting polybutene having an average molecular weight of about 940, with $P_2S_5$ at a temperature of about 232° C. in a mole ratio of polybutene to $P_2S_5$ of 1.1:1 and in the presence of sulfur in an amount equal to 3 wt. percent of polybutene for a period of 10 hours. The reaction product was diluted with approximately 150 wt. percent of naphthene base oil having an SUS viscosity at 100° F. of 100, then steamed at 176° C. for 10 hours in a nitrogen atmosphere and then dried by the passage of nitrogen therethrough at 176° C. The hydrolyzed product was extracted with 50% by volume of methyl alcohol at 55° C. to get a methanol extract containing inorganic phosphorus acids and a lubricating oil raffinate containing hydrocarbonthiophosphonic acid of the formula:

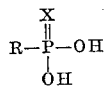

where R is a polybutene derived radical having an average molecular weight of 940, and X is a mixture of sulfur and oxygen. The oil solution of thiophosphonic acid was analyzed for sulfur and found to have a sulfur content of 0.5 wt. percent. If X was entirely sulfur, the sulfur content in the thiophosphonic acid solution would be 1.1 wt. percent. This indicates that X is a mixture of sulfur and oxygen.

The oil raffinate prepared above in the amount of 7000 grams containing 2.71 mole polybutene(940 M.W.)thiophosphonic acid was charged to a 12 liter, 3-neck flask equipped with a stirrer gas inlet tube extending below the surface of the acid reactant, a thermometer immersed in the acid and a water cooled reflux condenser. The acid was heated to 121° C. with stirring for over a 1 hour period and nitrogen blowing. Ethylene oxide was mixed with nitrogen and introduced into the reaction flask at a rate so as to maintain a gentle reflux with ethylene oxide. When ethylene oxide was no longer taken up, as evidenced by the increase in the reflux rate, its addition was stopped. The excess ethylene oxide reaction mixture was allowed to reflux for 1 hour. At the end of this period, the ethylene oxide in the reaction product was expelled therefrom. Upon cooling, there was obtained a reaction product in oil which was shown by analysis to consist of 2-hydroxyethyl polybutene(940 M.W.)thiophosphonate of the formula:

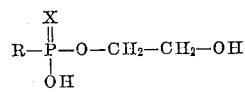

where R is a polybutene derived radical of an average molecular weight of 940 and X is a mixture of sulfur and oxygen. Analysis of the product for sulfur found to have a sulfur content of 0.5 wt. percent (based on the oil solution). Theoretical wt. percent for sulfur when X equals 100% sulfur is 1.1 wt. percent (based on the oil solution), establishing X is a mixture of sulfur and oxygen.

Example II 272 grams of the oil raffinate prepared as in Example I containing 0.1 mole of 2-hydroxyethyl polybutene(940 M.W.)thiophosphonate was charged to a 1 liter, 3-neck flask equipped with a stirrer, thermometer and gas inlet tubes. The stirring was begun and the mixture was heated to 93° C. whereupon 51 grams (0.11 mole) diisodecyl 4,5-epoxyhexahydronaphthalate and 1.4 grams (0.1 mole) boron trifluoride etherate were added. The reaction mixture was heated and stirred at 93° C. for 2 hour period. At the end of the reaction period the reaction mixture was purified by stripping with nitrogen at a temperature of 93° C. under a mercury pressure of 1–2 mm. Hg. The oil residue was found to contain diisodecyl 4-polybutene-(940 M.W.)thiophosphonoxyethoxyl - 5 - hydroxyhexahydrophthalate of the formula:

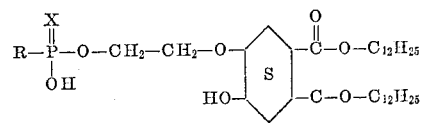

where R is a polybutene derived radical of an average molecular weight of 940, X is a mixture of sulfur and oxygen. The product analyzed as follows:

| Description | Calculated | Found |
|---|---|---|
| Phosphorous, wt. percent | 0.98 | 0.88 |
| Hydroxyl No. | 19 | 24 |
| Neut. No. | 0 | 5.5 |
| Mole ratio hexahydrophthalate/thiophosphonates in reaction product | 1 | 1.08 |

We claim:
1. An alkoxyhexahydrophthalate derivative of the formula:

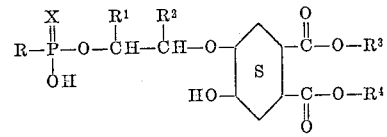

where R is a hydrocarbyl derived from an aliphatic polyolefin having an average molecular weight between about 250 and 50,000, $R^1$ and $R^2$ are selected from the group consisting of hydrogen and alkyl of from 1 to 6 carbons, $R^3$ and $R^4$ are alkyl of from 1 to 20 carbons, and X is a chalcogen selected from the group consisting of sulfur and a mixture of sulfur and oxygen.

2. A derivative in accordance with claim 1 wherein X is a mixture of sulfur and oxygen.

3. A derivative in accordance with claim 1 wherein R is polybutene of an average molecular weight of 940, $R^1$ and $R^2$ are hydrogen, $R^3$ and $R^4$ are isodecyl, and X is a mixture of sulfur.

4. A method of preparing an alkoxyhydroxyhexahydrophthalate of the formula:

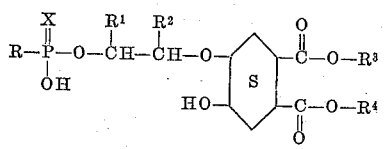

where R is a hydrocarbyl derived from an aliphatic polyolefin having an average molecular weight between about 250 and 50,000, $R^1$ and $R^2$ are selected from the group consisting of hydrogen and alkyl of from 1 to 6 carbons, $R^3$ and $R^4$ are alkyl of from 1 to 20 carbons, X is a chalcogen selected from the group consisting of sulfur and a mixture of sulfur and oxygen comprising contacting a thiophosphonate of the formula:

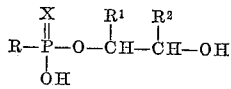

with a dialkyl epoxyhexahydrophthalate of the formula:

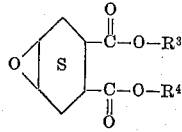

where $R^1$, $R^2$, $R^3$, $R^4$, and X are as heretofore defined at a temperature between about 25 and 150° C. and in the presence of catalyst in a mole ratio of said thiophosphonate to said phthalate to catalyst between about 0.1:1:0.001 and 2:1:0.1.

5. A method in accordance with claim 4 wherein X is a mixture of sulfur and oxygen.

6. A method in accordance with claim 4 wherein R is polybutene having an average molecular weight of 940, $R^3$ and $R^4$ are isodecyl, X is a mixture of sulfur and oxygen and said catalyst is boron trifluoride etherate.

7. A method of preparing a dialkyl hydrocarbonthiophosphonoxyalkoxyhydroxyhexahydrophthalate comprising:

(a) reacting $P_2S_5$ with an aliphatic polyolefin hydrocarbon having an average molecular weight between about 250 and 50,000 at a temperature between about 100 and 320° C. in an inert atmosphere, the $P_2S_5$ constituting between about 5 and 40 wt. percent of the reaction mass, (b) contacting the resulting $P_2S_5$-aliphatic polyolefin hydrocarbon reaction mixture with steam at a temperature between about 100 and 260° C. and removing formed inorganic phosphorus acids from the steam treated reaction mixture, (c) contacting the resultant inorganic phosphorus acid free, steam treated reaction mixture of (b) with an alkylene oxide of the formula:

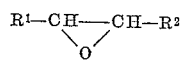

where $R^1$ and $R^2$ are members selected from the group consisting of hydrogen and alkyl of from 1 to 6 carbons, at a temperature between about 60 and 150° C. under a pressure between atmospheric and 500 p.s.i.g. in a mole ratio of said reaction mixture to said alkylene oxide of between 1:1 and 1:4.

(d) contacting the resultant alkylene oxide reacted inorganic phosphorus acid free, steam treated $P_2S_5$-aliphatic polyolefinic hydrocarbon reaction product of (c) with a dialkyl epoxyhexahydrophthalate of the formula:

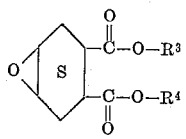

where $R^3$ and $R^4$ are alkyl of from 1 to 20 carbons at a temperature between 25 and 150° C. and in the presence of catalyst in a mole ratio of said reaction product to said phthalate to catalyst between about 0.1:1:0.001 and 2:1:0.1.

No references cited.

CHARLES B. PARKER, *Primary Examiner.*
IRVING MARCUS, *Examiner.*